United States Patent
Sakamoto et al.

(10) Patent No.: US 7,966,006 B2
(45) Date of Patent: Jun. 21, 2011

(54) MOBILE PHONE HAVING A NON-TELEPHONE FUNCTION AND TIMING RESET UNIT

(75) Inventors: Youhei Sakamoto, Osaka (JP); Masaaki Okahashi, Nara (JP); Ikue Yamashita, Osaka (JP)

(73) Assignee: Kyocera Corporation, Kyoto (JP)

( * ) Notice: Subject to any disclaimer, the term of this patent is extended or adjusted under 35 U.S.C. 154(b) by 283 days.

(21) Appl. No.: 10/573,805

(22) PCT Filed: Oct. 1, 2004

(86) PCT No.: PCT/JP2004/014884
§ 371 (c)(1),
(2), (4) Date: Mar. 28, 2006

(87) PCT Pub. No.: WO2005/034484
PCT Pub. Date: Apr. 14, 2005

(65) Prior Publication Data
US 2007/0121533 A1      May 31, 2007

(30) Foreign Application Priority Data
Oct. 3, 2003   (JP) .................................. 2003-346392

(51) Int. Cl.
*H04M 3/00* (2006.01)
(52) U.S. Cl. .................. 455/418; 455/414.1; 455/556.2; 455/575.3; 455/575.4
(58) Field of Classification Search .................. 455/418, 455/414.1, 556.2, 575.3, 575.4
See application file for complete search history.

(56) References Cited

U.S. PATENT DOCUMENTS

| 6,725,064 | B1 * | 4/2004 | Wakamatsu et al. | 455/566 |
| 6,947,728 | B2 * | 9/2005 | Tagawa et al. | 455/414.1 |
| 7,096,045 | B2 * | 8/2006 | Yoshinaga | 455/567 |
| 2002/0082059 | A1 * | 6/2002 | Nariai et al. | 455/573 |
| 2002/0123368 | A1 * | 9/2002 | Yamadera et al. | 455/556 |

FOREIGN PATENT DOCUMENTS

| JP | 4-343532 | 11/1992 |
| JP | 5-268151 | 10/1993 |
| JP | 6-45236 | 6/1994 |
| JP | 8-84172 | 3/1996 |
| JP | 9-321853 | 12/1997 |
| JP | 2002-101164 | 4/2002 |

* cited by examiner

*Primary Examiner* — Charles Shedrick
(74) *Attorney, Agent, or Firm* — Morrison & Foerster LLP

(57) ABSTRACT

The present invention is a mobile phone having a non-telephone function (e.g. a radio function) that is different from a telephone function, and comprising: a non-telephone function unit (a radio functioning unit) operable to execute the non-telephone function; an auto-power-off control unit operable to cause a timer to operate during execution of the non-telephone function, and automatically stop the execution of the non-telephone function when the timer indicates an elapse of a predetermined time period; a telephone function unit operable to execute the telephone function; and a reset unit operable to reset the timer to an initial state each time a predetermined operation relating to the telephone function is executed. The present invention successfully reduces occurrences of unwanted auto power off during the time when the non-telephone function is in execution—for example, the auto power off of the radio function during the time when the user is listening to the radio.

11 Claims, 2 Drawing Sheets

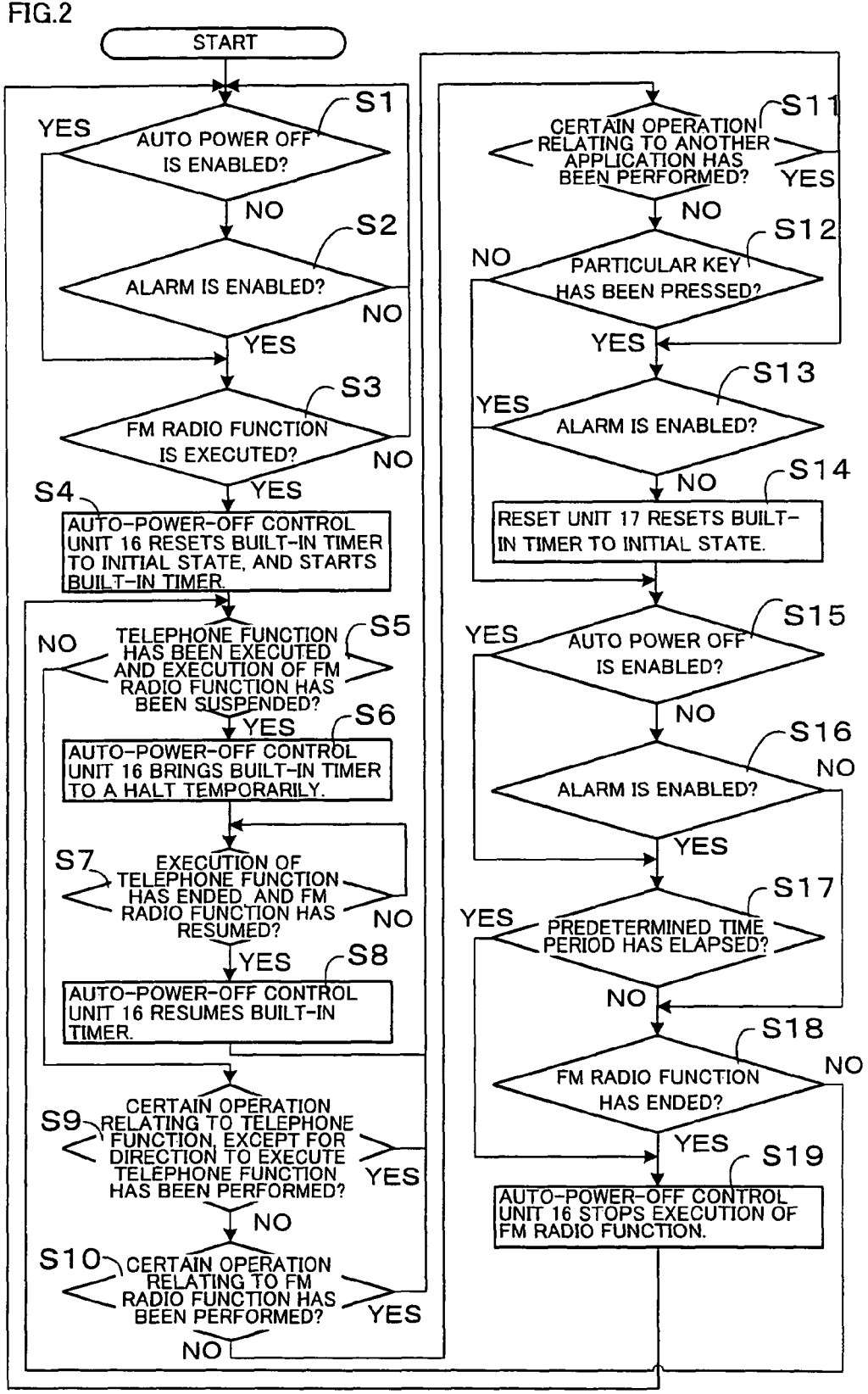

MOBILE PHONE HAVING A NON-TELEPHONE FUNCTION AND TIMING RESET UNIT

TECHNICAL FIELD

The present invention relates to a mobile phone having functions other than a telephone function—such as a radio function, and in particular to a control technique for automatically stopping the non-telephone functions.

BACKGROUND ART

In recent years, mobile phones are spreading dramatically, and models having functions other than the telephone function (referred to hereinafter as "non-telephone functions") pop up one after another.

The non-telephone functions here include, for example: a digital camera function; an Internet connecting function; a music play function; a radio function; and a TV function.

On the other hand, many mobile phones have limitations in the capacity of the battery. Therefore, as for functions not required to be performed on a steady basis—such as a backlight for LCD display and lighting for illuminated ten keys, a timer is activated immediately after execution of a function resulting from change in the LCD display by the user or operation on the ten keys, for example. Subsequently, the function is automatically terminated after the elapse of a predetermined time period ranging from several seconds to several tens of seconds.

Additionally, in the case of a mobile phone with a radio, the battery is consumed in vain and depleted quickly if the user falls asleep while listening to the radio or forgets to turn off the radio, for example. In order to avoid such occurrences, it is desirable to perform auto-power-off control that automatically turns the power of the radio off after the elapse of a predetermined time period since execution of the radio function.

A mobile phone in which a function as a portable music play device is incorporated is disclosed in Japanese Laid-Open Patent Application Publication No. 2002-101164.

However, the user would not want the power of the radio function being automatically turned off after the elapse of a predetermined time period since execution of the radio function while still listening to the radio. Besides, the user has to turn on the power every time after the elapse of a predetermined time period, which is too much of a bother.

Given this factor, the present invention aims at offering a mobile phone and an automatic stopping method that reduce occurrences of the unwanted auto power off during the time when a non-telephone function is in execution—for example, the auto power off of the radio function during the time when the user is actually listening to the radio.

DISCLOSURE OF THE INVENTION

In order to achieve the stated object, the mobile phone of the present invention is a mobile phone having a non-telephone function, which is a different function from a telephone function, in addition to the telephone function, comprising: a non-telephone unit operable to execute the non-telephone function; an auto-power-off unit operable to cause a timer to operate during execution of the non-telephone function, and automatically stop the execution of the non-telephone function when the timer indicates an elapse of a predetermined time period; a telephone unit operable to execute the telephone function; and a reset unit operable to reset the timer to an initial state each time a predetermined operation relating to the telephone function is executed.

In order to achieve the stated object, the automatic stopping method of the present invention is an automatic stopping method used in a mobile phone having a non-telephone function, which is a different function from a telephone function, in addition to the telephone function and used for automatically stopping execution of the non-telephone function, the automatic stopping method comprising the steps of: (a) causing a timer to operate during the execution of the non-telephone function, and judging, according to the timer, whether a predetermined time period has elapsed; (b) resetting the timer to an initial state each time a certain operation relating to the telephone function is executed; and (c) automatically stopping the execution of the non-telephone function when the step (a) determines that the predetermined time period has elapsed.

Herewith, the timer used for the auto power off of the non-telephone function, such as a radio function, is reset to the initial state every time a certain operation relating to the telephone function is executed. As a result, it is possible to reduce occurrences of the unwanted auto power off during the time when the non-telephone function is in execution—for example, when the radio function is being executed for the user listening to the radio at the time.

Here, the reset unit may reset the timer to the initial state at end of a telephone call.

Herewith, the timer can be reset to the initial state at the end of a telephone call, which enables restart of the measurement of the predetermined time period at the end of the telephone call.

Here, the telephone unit may stop executing the telephone function when receiving a disconnect signal via a telephone line at the end of the telephone call. In this case, the reset unit resets the timer to the initial state when the execution of the telephone function is stopped by receiving the disconnect signal.

Herewith, the timer can be reset to the initial state when the transmitted disconnect signal informing the disconnection of the telephone call is received, which enables restart of the measurement of the predetermined time period at the end of the telephone call without user operation.

Here, the reset unit may reset the timer to the initial state when the mobile phone is flipped/slid open or closed.

Herewith, the timer can be reset to the initial state when the mobile phone is flipped/slid open or closed, which enables restart of the measurement of the predetermined time period.

Here, the reset unit may further reset the timer to the initial state each time execution of a certain operation relating to the non-telephone unit is started.

Herewith, the timer can be reset to the initial state every time a certain operation relating to the non-telephone unit—for example, adjustment of sound volume or change of a channel on the radio—is executed, which enables restart of the measurement of the predetermined time period when the certain operation relating to the non-telephone unit is started.

Here, the mobile phone may further comprise: an application unit operable to execute an application different from the non-telephone function and the telephone function. In this case, the reset unit further resets the timer to the initial state each time execution of a certain operation relating to the application unit is started.

Herewith, the timer can be reset to the initial state every time a certain operation relating to another application—for example, resumption or suspension of the another application—is executed, which enables restart of the measurement of the predetermined time period when the certain operation relating to the application is started.

Here, the reset unit may reset the timer to the initial state each time a particular key is pressed by a user.

Herewith, the timer can be reset to the initial state every time the user presses a particular key—for example, a side key being held down for a while, which enables restart of the measurement of the predetermined time period when the particular key is pressed down.

Here, the mobile phone may further comprise: an alarm unit operable to execute an alarm function in a case when an alarm setting has been made by a user. In this case, the reset unit refrains from resetting the timer to the initial state when the alarm setting has been made.

Herewith, because the timer is not reset to the initial state when the alarm is set, occurrences of the alarm being inactivated due to battery depletion can be avoided.

The mobile phone may further comprise: an alarm unit operable to execute an alarm function in a case when an alarm setting has been made by a user. In this case, the auto-power-off unit automatically stops the execution of the non-telephone function in a case when (i) an auto-power-off setting has been made by the user, or (ii) the alarm setting has been made by the user although the auto-power-off setting has not been made.

Herewith, since the auto power off is executed without fail when the alarm is set, occurrences of the alarm being inactivated due to battery depletion can be avoided.

Here, the non-telephone function may be any of a digital camera function, an Internet connecting function, a music play function, a radio function, and a TV function.

Herewith, the timer used for the auto power off of any of the following functions can be reset to the initial state every time a certain operation relating to the telephone function is executed: a digital camera function; an Internet connecting function; a music play function; a radio function; and a TV function. Accordingly, it is possible to reduce occurrences of the unwanted auto power off during the time when the digital camera function is in use; when the Internet is connected; when music is being played back; when the user is listening to the radio; or when the user is watching TV.

BRIEF DESCRIPTION OF THE DRAWINGS

FIG. 2 shows a procedure for auto-power-off control of the mobile phone 1 according to the first embodiment of the present invention.

BEST MODE FOR CARRYING OUT THE INVENTION

First Embodiment

<Structure>

Figure 1:
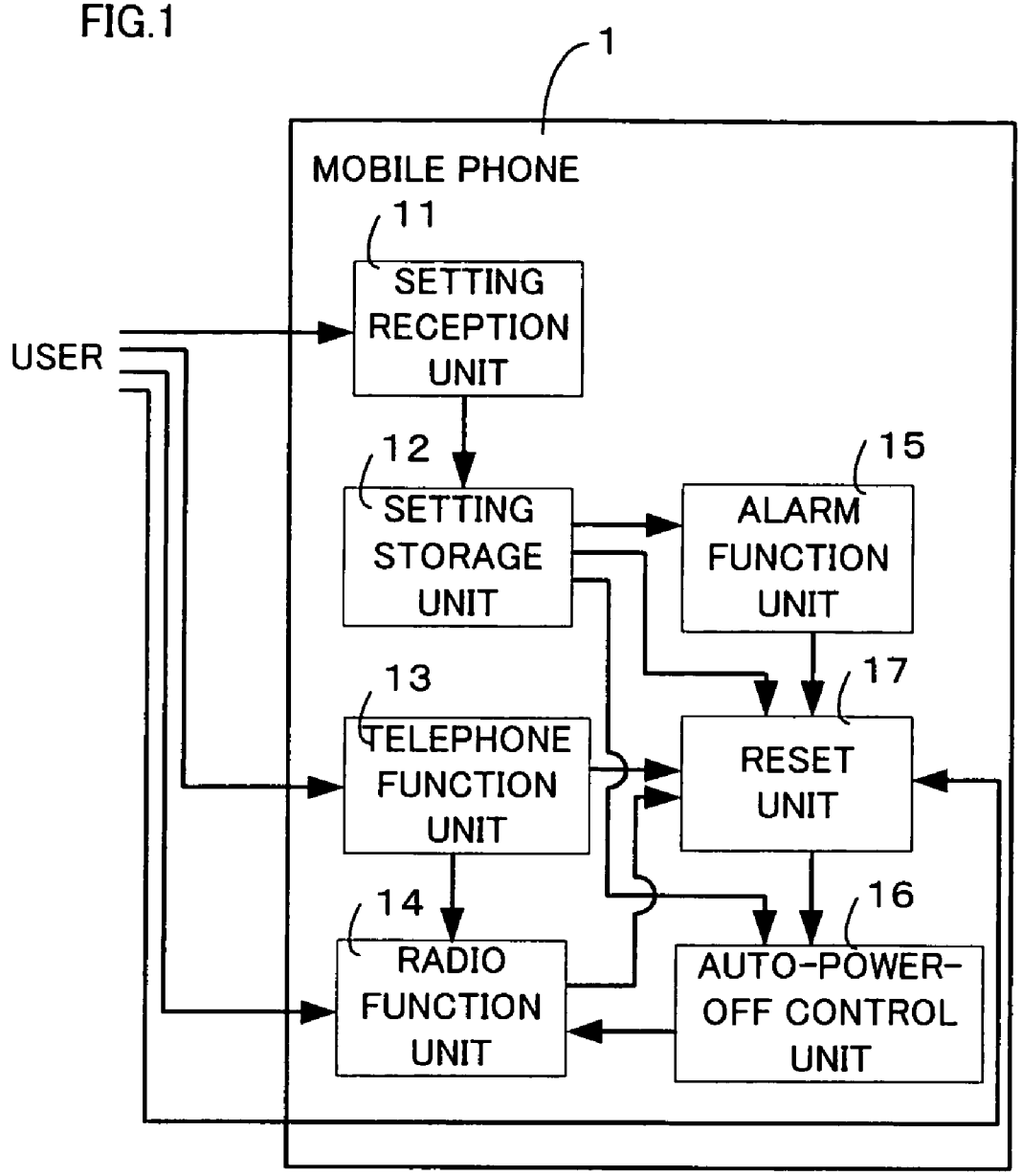
FIG. 1 shows a simple overview of a mobile phone 1 according to a first embodiment of the present invention.

FIG. 1 shows a simple overview of a mobile phone 1 according to a first embodiment of the present invention.

The mobile phone 1 of the first embodiment comprises: a setting reception unit 11; a setting storage unit 12; a telephone function unit 13; a radio function unit 14; an alarm function unit 15; an auto-power-off control unit 16; and a reset unit 17, as shown in FIG. 1.

The setting reception unit 11 receives individual settings for the alarm and the auto power off from the user. The setting reception unit 11 receives, from the user, settings for: the alarm time; the alarm volume; the alarm tone; whether the alarm is enabled or disabled (i.e. on or off); the auto-power-off time; and whether the auto power off is enabled or disabled, for example.

The setting storage unit 12 stores settings received by the setting reception unit 11.

The telephone function unit 13 performs the telephone function according to the user's instruction.

The radio function unit 14 performs an FM radio function, and receives FM radio and reproduces the audio according to the user's instruction during the time when the telephone function by the telephone function unit 13 is not being executed.

The alarm function unit 15 sounds the alarm at the alarm time stored in the setting storage unit 12 in the case when a setting for enabling the alarm is stored in the setting storage unit 12.

In the case when a setting for enabling the auto power off is stored in the setting storage unit 12, the auto-power-off control unit 16 causes a built-in timer to operate during execution of the FM radio function, and automatically stops the execution of the FM radio function when the built-in timer indicates that a predetermined time period has elapsed.

Additionally, in order to avoid occurrences of the alarm being inactivated due to battery depletion, even when a setting for disabling the auto power off is stored in the setting storage unit 12, if the setting for enabling the alarm is stored, the auto-power-off control unit 16 causes the built-in timer to operate during the execution of the FM radio function, and automatically stops the execution when the built-in timer indicates that a predetermined time period has elapsed.

Here, assume that the auto-power-off control unit 16 has an auto-power-off time of two hours in the default configuration, and that the built-in timer times a duration of two hours.

The reset unit 17 resets the built-in timer to the initial state every time the following happens: a certain operation relating to the telephone function is executed; a certain operation relating to the FM radio function is executed; a certain operation relating to another application is executed; and a particular key is pressed.

Here, the followings are examples of the "certain operation relating to the telephone function": end of a telephone call due to receiving a disconnect signal via a telephone line or due to the hung up button being pressed; a flip open or a flip close in the case of a flip phone; a slide open or a slide close in the case of a slide phone; and a setting change related to telephone calls.

The followings are examples of the "certain operation relating to the FM radio function": change of a channel and adjustment of the sound volume.

The followings are examples of the "certain operation relating to another application": resumption of the application; suspension of the application; and a setting change in the application. For instance, in the case of an alarm application, the alarm time, the alarm volume, the alarm tone, and whether the alarm is enabled or disabled are examples of such an operation.

The press down of a particular key is, for example, holding a side key down for a while.

Note that, when the setting for enabling the alarm is stored in the setting storage unit 12, the reset unit 17 refrains from resetting the timer to the initial state in order to avoid occurrences of the alarm being inactivated due to battery depletion.

<Operations>

FIG. 2 shows a procedure for the auto-power-off control of the mobile phone 1 according to the first embodiment of the present invention.

The following explains the procedure of the auto-power-off control with the aid of FIG. 2.

(1) The auto-power-off control unit 16 judges whether the setting for enabling the auto power off is stored in the setting storage unit 12 (Step S1).

(2) In the case when the setting for enabling the auto power off is not stored, the auto-power-off control unit 16 then judges whether the setting for enabling the alarm is stored in the setting storage unit 12 (Step S2).

(3) In the case when the setting for enabling the auto power off is stored, or when the setting for enabling the alarm is stored, the auto-power-off control unit 16 waits until the FM radio function is executed by the radio function unit 14 (Step S3).

(4) When the FM radio function is executed, the auto-power-off control unit 16 overwrites a counter value of the built-in timer with a value corresponding to two hours to thereby reset the built-in timer to the initial state, and starts the built-in timer (Step S4).

(5) The auto-power-off control unit 16 judges whether the telephone function has been executed by the telephone function unit 13 and the execution of the FM radio function has been suspended (Step S5).

(6) In the case when the telephone function has been executed and the execution of the FM radio function has been suspended, the auto-power-off control unit 16 brings the built-in timer to a halt temporarily (Step S6).

(7) The auto-power-off control unit 16 waits until the execution of the telephone function ends and the execution of the FM radio function resumes (Step S7).

(8) When the execution of the telephone function ends and the execution of the FM radio function resumes, the auto-power-off control unit 16 resumes the built-in timer (Step S8).

(9) The auto-power-off control unit 16 judges whether a certain operation relating to the telephone function, except for a direction to execute the telephone function, has been executed (Step S9).

(10) The auto-power-off control unit 16 judges whether a certain operation relating to the FM radio function has been executed (Step S10).

(11) The auto-power-off control unit 16 judges whether a certain operation relating to an application other than the telephone and FM radio functions has been executed (step S11).

(12) The auto-power-off control unit 16 judges whether a particular key has been pressed (Step S12).

(13) The auto-power-off control unit 16 judges whether the setting for enabling the alarm is stored in the setting storage unit 12 in the case when (i) a certain operation relating to the telephone function has been executed; (ii) a certain operation relating to the FM radio function has been executed; (iii) a certain operation relating to another application has been executed; and (iv) a particular key has been pressed (Step S13).

(14) In the case when the setting for enabling the alarm is not stored, the reset unit 17 resets the built-in timer of the auto-power-control unit 16 to the initial state (Step S14).

(15) The auto-power-off control unit 16 judges whether the setting for enabling the auto power off is stored in the setting storage unit 12 (Step S15).

(16) In the case when the setting for enabling the auto power off is not stored, the auto-power-off control unit 16 then judges whether the setting for enabling the alarm is stored in the setting storage unit 12 (Step S16).

(17) In the case when the setting for enabling the auto power off is stored, or when the setting for enabling the alarm is stored, the auto-power-off control unit 16 then judges whether the built-in timer indicates the elapse of the predetermined time period (Step S17).

(18) The auto-power-off control unit 16 judges whether the end of the FM radio function is directed (Step S18).

(19) The auto-power-off control unit 16 stops the execution of the FM radio function when the predetermined time period has elapsed, or when the end of the FM radio function has been directed (Step S19).

<Conclusion>

As has been described above, according to the first embodiment of the present invention, the timer used for the auto power off of the FM radio function is reset to the initial state every time the following happens: a certain operation relating to the telephone function is executed; a certain operation relating to the FM radio function is executed; a certain operation relating to other applications is executed; and a particular key is pressed. As a result, occurrences of the unwanted auto power off during the time when the user is listening to the radio can be reduced.

INDUSTRIAL APPLICABILITY

The present invention is applicable to a mobile phone with an FM radio. According to the present invention, occurrences of the unwanted auto power off during the time when the user is listening to the radio can be reduced, which enables the user to enjoy FM radio in a more comfortable manner as compared to conventional techniques.

Besides the mobile phone with an FM radio, the present invention is also applicable to a mobile phone having other various non-telephone functions.

Here, the various non-telephone functions include, for example: a digital camera function; an Internet connecting function; a music play function; a radio function; and a TV function.

The invention claimed is:

1. A mobile phone having a non-telephone function, which is a different function from a telephone function, in addition to the telephone function, comprising:
a timer operable to count time;
a non-telephone unit operable to execute the non-telephone function;
a non-telephone function stop unit operable to cause the timer to operate during execution of the non-telephone function, and automatically stop the execution of the non-telephone function when the timer indicates an elapse of a predetermined time period;
a telephone unit operable to execute the telephone function; and
a reset unit operable, if the timer is being operated in response to the execution of the non-telephone function, to reset the timer to an initial state each time a predetermined operation relating to the telephone function is executed, wherein
when the timer is reset to the initial state, the timer starts to measure the predetermined time period, and
the non-telephone function stop unit stops the execution of the non-telephone function at the elapse of the predetermined time period from the execution of the predetermined operation relating to the telephone function.

2. The mobile phone of claim 1, wherein
the reset unit resets the timer to the initial state at end of a telephone call.

3. The mobile phone of claim 2, wherein
the telephone unit stops executing the telephone function when receiving a disconnect signal via a telephone line at the end of the telephone call, and the reset unit resets the timer to the initial state when the execution of the telephone function is stopped by receiving the disconnect signal.

4. The mobile phone of claim 1, wherein
the reset unit resets the timer to the initial state when the mobile phone is flipped/slid open or closed.

5. The mobile phone of claim 1, wherein
the reset unit further resets the timer to the initial state each time execution of a certain operation relating to the non-telephone unit is started.

6. The mobile phone of claim 1, further comprising:
an application unit operable to execute an application different from the non-telephone function and the telephone function, wherein
the reset unit further resets the timer to the initial state each time execution of a certain operation relating to the application unit is started.

7. The mobile phone of claim 1, wherein
the reset unit resets the timer to the initial state each time a particular key is pressed by a user.

8. The mobile phone of claim 1, further comprising:
an alarm unit operable to execute an alarm function in a case when an alarm setting has been made by a user, wherein
the reset unit refrains from resetting the timer to the initial state when the alarm setting has been made.

9. The mobile phone of claim 1, further comprising:
an alarm unit operable to execute an alarm function in a case when an alarm setting has been made by a user, wherein
the non-telephone function stop unit automatically stops the execution of the non-telephone function in a case when (i) an auto-power-off setting has been made by the user, or
(ii) the alarm setting has been made by the user although the auto-power-off setting has not been made.

10. The mobile phone of claim 1, wherein
the non-telephone function is any of a digital camera function, an Internet connecting function, a music play function, a radio function, and a TV function.

11. An automatic stopping method used in a mobile phone having a non-telephone function in addition to a telephone function and used for automatically stopping execution of the non-telephone function, the automatic stopping method comprising the steps of:
(a) causing a timer, operable to count time, to operate during the execution of the non-telephone function, and judging, according to the timer, whether a predetermined time period has elapsed;
(b) if the timer is being operated in response to the execution of the non-telephone function, resetting the timer to an initial state each time a certain operation relating to the telephone function is executed; and
(c) automatically stopping the execution of the non-telephone function when the step (a) determines that the predetermined time period has elapsed, wherein
when the timer is reset to the initial state, the timer starts to measure the predetermined time period, and
in the step (c), the execution of the non-telephone function is stopped at the elapse of the predetermined time period from the execution of the predetermined operation relating to the telephone function.

* * * * *